(12) United States Patent
Krishan

(10) Patent No.: US 11,483,694 B2
(45) Date of Patent: Oct. 25, 2022

(54) METHODS, SYSTEMS, AND COMPUTER READABLE MEDIA FOR SERVICE COMMUNICATIONS PROXY (SCP)-SPECIFIC PRIORITIZED NETWORK FUNCTION (NF) DISCOVERY AND ROUTING

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 133 days.

(21) Appl. No.: 17/009,725

(22) Filed: Sep. 1, 2020

(65) Prior Publication Data

US 2022/0070648 A1    Mar. 3, 2022

(51) Int. Cl.
*H04L 29/08* (2006.01)
*G06F 15/16* (2006.01)
(Continued)

(52) U.S. Cl.
CPC ............. *H04W 8/005* (2013.01); *H04L 67/56* (2022.05); *H04W 76/14* (2018.02)

(58) Field of Classification Search
CPC .... H04W 8/005; H04W 76/14; H04L 67/101; H04L 67/16; H04L 61/1541; H04L 67/51;
(Continued)

(56) References Cited

U.S. PATENT DOCUMENTS 6,014,558 A   1/2000  Thomas
6,725,278 B1  4/2004  Gonzalez
(Continued)

FOREIGN PATENT DOCUMENTS

CN   101512971 A   0/8200
CN   101366311 A   2/2009
(Continued)

OTHER PUBLICATIONS

Notification of Transmittal of the International Search Report and the Written Opinion of the International Searching Authority, or the Declaration for International Application Serial No. PCT/US2020/065765 (dated Apr. 15, 2021).
(Continued)

*Primary Examiner* — Ivan O Latorre
*Assistant Examiner* — Vanneilian Lalchinthang
(74) *Attorney, Agent, or Firm* — Jenkins, Wilson, Taylor & Hunt, P.A.

(57) ABSTRACT

A method for service communication proxy (SCP)-specific prioritized producer network function (NF) discovery and routing includes maintaining, at the SCP, a producer NF latency database including SCP-specific producer NF latency information. The method further includes receiving a discovery request message or receiving a service request message having a 3GPP-Sbi-Discovery header and generating, at the SCP, a discovery request message in response to the received service request message and modifying, the discovery request message to include the SCP-specific producer NF latency information. The method further includes forwarding, by the SCP, the discovery request message to an NF repository function (NRF). The method further includes, at the NRF, creating a list of NF and their associated service profiles of producer NF instances and their respective producer NF service instances capable of providing the service
(Continued)

identified in the discovery request message. The method further includes setting or adjusting, by the NRF and based on the SCP-specific producer NF latency information, priorities of NF and service profiles of producer NF and producer NF service instances in the list. The method further includes forwarding, by the NRF and to the SCP, a discovery response message including the list of NF and associated service profiles of producer NF instances and their respective producer NF service instances.

20 Claims, 7 Drawing Sheets

(51) Int. Cl.
  *H04L 29/12* (2006.01)
  *H04W 8/00* (2009.01)
  *H04W 76/14* (2018.01)
  *H04L 67/56* (2022.01)

(58) Field of Classification Search
  CPC . H04L 67/28; H04L 61/4541; H04L 61/4511; H04L 61/58; H04L 67/56; H04L 67/562; G06Q 20/382
  USPC .......................................................... 370/329
  See application file for complete search history.

(56) References Cited

U.S. PATENT DOCUMENTS

| | | |
|---|---|---|
| 6,748,435 B1 | 6/2004 | Wang et al. |
| 7,151,945 B2 | 12/2006 | Myles et al. |
| 7,706,822 B2 | 4/2010 | Emeott et al. |
| 8,306,034 B2 | 11/2012 | Jang et al. |
| 8,620,858 B2 | 12/2013 | Backholm et al. |
| 8,767,705 B2 | 7/2014 | Göppner et al. |
| 8,811,228 B2 | 8/2014 | Lopez et al. |
| 8,811,372 B2 | 8/2014 | Li et al. |
| 8,824,449 B2 | 9/2014 | van der Wateren et al. |
| 9,124,537 B2 | 9/2015 | Kolze |
| 9,246,762 B1 | 1/2016 | Watkins |
| 9,386,551 B2 | 7/2016 | Zhou et al. |
| 9,667,590 B2 | 5/2017 | Yan et al. |
| 10,097,504 B2 | 10/2018 | Backholm |
| 10,299,128 B1 | 5/2019 | Suthar et al. |
| 10,313,362 B2 | 6/2019 | Ahuja et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,609,530 B1 | 3/2020 | Patil et al. |
| 10,616,934 B2 | 4/2020 | Talebi Fard et al. |
| 10,637,753 B1* | 4/2020 | Taft .......................... H04L 41/04 |
| 10,652,098 B2 | 5/2020 | Kim |
| 10,772,062 B1* | 9/2020 | Albasheir ............. H04W 48/16 |
| 10,778,527 B2 | 9/2020 | Assali et al. |
| 10,791,044 B1 | 9/2020 | Krishan et al. |
| 10,819,636 B1 | 10/2020 | Goel |
| 10,833,938 B1 | 11/2020 | Rajput et al. |
| 11,109,307 B2 | 8/2021 | Bartolome Rodrigo et al. |
| 11,220,027 B2 | 1/2022 | Heath, III et al. |
| 11,224,009 B2 | 1/2022 | Krishan |
| 11,271,846 B2 | 3/2022 | Krishan |
| 11,290,549 B2 | 3/2022 | Krishan |
| 2004/0062278 A1 | 4/2004 | Hadzic et al. |
| 2004/0208183 A1 | 10/2004 | Balachandran et al. |
| 2005/0193096 A1 | 9/2005 | Yu et al. |
| 2005/0232407 A1 | 10/2005 | Craig et al. |
| 2006/0010224 A1* | 1/2006 | Sekar ................... G06Q 20/382 709/217 |
| 2007/0050331 A1 | 3/2007 | Bauman et al. |
| 2007/0242738 A1 | 10/2007 | Park et al. |
| 2008/0165761 A1 | 7/2008 | Goppner et al. |
| 2009/0006652 A1 | 1/2009 | Kasatani |
| 2009/0024727 A1 | 1/2009 | Jeon et al. |
| 2009/0055835 A1 | 2/2009 | Zhu |
| 2009/0141625 A1 | 6/2009 | Ghai et al. |
| 2009/0222584 A1* | 9/2009 | Josefsberg .......... H04L 61/4511 709/245 |
| 2011/0078674 A1 | 3/2011 | Ershov |
| 2011/0202604 A1 | 8/2011 | Craig et al. |
| 2013/0029708 A1 | 1/2013 | Fox et al. |
| 2013/0198269 A1* | 8/2013 | Fleischman ............. H04L 61/50 709/203 |
| 2013/0272123 A1* | 10/2013 | Lee ................... H04W 28/0252 370/230 |
| 2014/0075004 A1 | 3/2014 | Van Dusen et al. |
| 2014/0379901 A1 | 12/2014 | Tseitlin et al. |
| 2015/0039560 A1 | 2/2015 | Barker et al. |
| 2015/0071074 A1 | 3/2015 | Zaidi et al. |
| 2015/0119101 A1 | 4/2015 | Cui et al. |
| 2015/0358385 A1 | 12/2015 | Ruellan et al. |
| 2016/0156513 A1 | 6/2016 | Zhang et al. |
| 2016/0350683 A1 | 12/2016 | Bester et al. |
| 2016/0352588 A1 | 12/2016 | Subbarayan et al. |
| 2016/0380906 A1* | 12/2016 | Hodique ............. H04L 67/1023 709/226 |
| 2017/0221015 A1 | 8/2017 | June et al. |
| 2018/0039494 A1 | 2/2018 | Lander et al. |
| 2018/0083882 A1 | 3/2018 | Krishan et al. |
| 2018/0213391 A1 | 7/2018 | Inoue |
| 2018/0262592 A1 | 9/2018 | Zandi et al. |
| 2018/0262625 A1* | 9/2018 | McCarley ............. H04M 15/64 |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0045351 A1 | 2/2019 | Zee et al. |
| 2019/0075552 A1 | 3/2019 | Yu et al. |
| 2019/0116217 A1 | 4/2019 | Dhanabalan |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230556 A1* | 7/2019 | Lee ........................ H04W 28/16 |
| 2019/0245767 A1 | 8/2019 | Di Girolamo et al. |
| 2019/0261244 A1 | 8/2019 | Jung et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0357216 A1 | 11/2019 | Jung et al. |
| 2019/0370028 A1 | 12/2019 | Shi et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0008069 A1 | 1/2020 | Zhu et al. |
| 2020/0028920 A1 | 1/2020 | Livanos et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |

(56) References Cited

U.S. PATENT DOCUMENTS

| | | |
|---|---|---|
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1* | 4/2020 | Stammers ............... H04L 67/51 |
| 2020/0153886 A1 | 5/2020 | Dhanabalan |
| 2020/0305033 A1 | 9/2020 | Keller et al. |
| 2020/0313996 A1 | 10/2020 | Krishan et al. |
| 2020/0314615 A1 | 10/2020 | Patil et al. |
| 2020/0336554 A1 | 10/2020 | Deshpande et al. |
| 2020/0404608 A1 | 12/2020 | Albasheir et al. |
| 2020/0412597 A1 | 12/2020 | Goel et al. |
| 2021/0000723 A1 | 1/2021 | Strand et al. |
| 2021/0007023 A1* | 1/2021 | Umapathy ...... H04W 36/00837 |
| 2021/0044481 A1* | 2/2021 | Xu ........................ H04W 72/02 |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2021/0385286 A1* | 12/2021 | Wang ................. H04L 61/4541 |
| 2021/0385732 A1 | 12/2021 | Reyes et al. |
| 2022/0015023 A1 | 1/2022 | De-Gregorio-Rodriguez et al. |
| 2022/0038545 A1 | 2/2022 | Krishan |
| 2022/0038999 A1 | 2/2022 | Sapra et al. |
| 2022/0060547 A1 | 2/2022 | Krishan |
| 2022/0131945 A1 | 4/2022 | Sapra et al. |

FOREIGN PATENT DOCUMENTS

| | | |
|---|---|---|
| CN | 105635345 B | 2/2019 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/144321 A1 | 8/2019 |
| WO | WO 2019/193129 A1 | 10/2019 |
| WO | WO 2019/215308 A1 | 11/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/138074 A1 | 7/2021 |
| WO | WO 2022/025987 A1 | 2/2022 |
| WO | WO 2022/025988 A1 | 2/2022 |
| WO | WO 2022/046170 A1 | 3/2022 |
| WO | WO 2022/050987 A1 | 3/2022 |
| WO | WO 2022/093319 A1 | 5/2022 |

OTHER PUBLICATIONS

Ex Parte Quayle Action for U.S. Appl. No. 16/730,799 (Apr. 7, 2021).

International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

Commonly-Assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).

"5G; System architecture for the 5G System (5GS) (3GPP TS 23.501 version 15.6.0 Release 15)," ETSI TS 123 501, V15.6.0, pp. 1-168 (Oct. 2019).

"5G; 5G System; Network function repository services; Stage 3 (3GPP TS 29.510 version 15.5.1 Release 15)," ETSI TS 129 510, V15.5.1, pp. 1-132 (Oct. 2019).

"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2," 3GPP TS 23.502 V16.4.0 pp. 1-582 (Mar. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Commonly-Assigned, co-pending U.S. Appl. No. 17/082,871 for "Methods, Systems, and Computer Readable Media for Rank Processing for Network Function Selection," (Unpublished, filed Oct. 28, 2020).

Commonly-Assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Non-Final Office Action for U.S. Appl. No. 16/697,021 (dated Sep. 29, 2020).

Notice of Allowance and Fee(s) Due for U.S. Appl. No. 16/527,988 (dated Sep. 17, 2020).

Final Office Action for U.S. Appl. No. 16/356,446 (dated Sep. 8, 2020).

Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

Commonly-Assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).

(56) References Cited

OTHER PUBLICATIONS

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

Ex Parte Quayle Action for U.S. Appl. No. 16/527,988 (Jun. 1, 2020).

Notice of Allowance and Fee(s) Due for U.S. Appl. No. 16/369,691 (dated May 12, 2020).

Non-Final Office Action for U.S. Appl. No. 16/356,446 (dated May 11, 2020).

Notice of Allowance and Fee(s) Due for U.S. Appl. No. 16/176,920 (dated Apr. 16, 2020).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Notification of Transmittal of the International Search Report and the Written Opinion of the International Searching Authority, or the Declaration for International Application Serial No. PCT/US2019/053912 (dated Dec. 18, 2019).

"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).

Commonly-Assigned, co-pending U.S. Appl. No. 16/527,988 for "Methods, Systems, and Computer Readable Media for Network Function (NF) Topology Synchronization," (Unpublished, filed Jul. 31, 2019).

"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).

Commonly-Assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).

Commonly-Assigned, co-pending U.S. Appl. No. 16/356,446 for "Methods, Systems, and Computer Readable Media for Locality-Based Selection and Routing of Traffic to Producer Network Functions (NFs)," (Unpublished, filed Mar. 18, 2019).

"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).

"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).

"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).

Commonly-Assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).

"5G; 5G System; Network function repository services; Stage 3 (3GPP TS 29.510 version 15.1.0 Release 15)," ETSI TS 129 510, V15.1.0, pp. 1-87 (Oct. 2018).

"5G; 5G System; Unified Data Repository Services; Stage 3 (3GPP TS 29.504 version 15.1.0 Release 15)," ETSI TS 129 504, V15.1.0, pp. 1-26 (Oct. 2018).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"5G; Procedures for the 5G System (3GPP TS 23.502 version 15.2.0 Release 15)," ETSI TS 123 502 V15.2.0, pp. 1-46 (Jun. 2018).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

Mayer, "RESTful APIs for the 5G Service Based Architecture," Journal of ICT, vol. 6_1&2, pp. 101-116 (2018).

"5G Service Based Architecture (SBA)," 5G, pp. 1-61 (downloaded Dec. 24, 2018).

Scholl et al., "An API First Approach to Microservices Development," Oracle, https://blogs.oracle.com/developers/an-api-first-approach-to-microservices-development, pp. 1-12 (Nov. 8, 2017).

"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Preston-Werner, "Semantic Versioning 2.0.0", Oracle, pp. 1-5 (Jun. 2013).

"LTE and Beyond," https://ytd2525.wordpress.com/2013/03/06/lte-and-beyond/, 3 pages (2013).

Nichols et al., "Definition of the Differentiated Services Field (DS Field) in the IPv4 and IPv6 Headers," Internet Engineering Task Force (IETF) Netwok Working Group Request for Comments (RFC) 2474, The Internet Society, pp. 1-20 (Dec. 1998).

Commonly-Assigned, co-pending U.S. Appl. No. 16/942,713 for "Methods, Systems, and Computer Readable Media for Providing Network Function Discovery Service Enhancements," (Unpublished, filed Jul. 29, 2020).

Notice of Allowance and Fee(s) Due for U.S. Appl. No. 16/730,799 (dated Aug. 16, 2021).

Communication of European publication number and information on the application of Article 67(3) EPC for European Patent Application Serial No. 19791391.6 (dated Aug. 11, 2021).

Commonly-Assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).

Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).

Commonly-Assigned, co-pending U.S. Appl. No. 17/337,356 for "Methods, Systems, and Computer Readable Media for Applying or

(56) References Cited

OTHER PUBLICATIONS

Overriding Preferred Locality Criteria in Processing Network Function (NF) Discovery Requests," (Unpublished, filed Jun. 2, 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; 5G System; Network Function Repository Services; Stage 3 (Release 17)," 3GPP TS 23.510, V17.1.0, pp. 1-243 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
Notice of Allowance and Fee(s) Due for U.S. Appl. No. 16/730,799 (dated Jul. 30, 2021).
Notification of Transmittal of the International Search Report and the Written Opinion of the International Searching Authority, or the Declaration for International Application No. PCT/US2021/024000 (dated Jun. 24, 2021).
Notification of Transmittal of the International Search Report and the Written Opinion of the International Searching Authority, or the Declaration for U.S. Patent Application Serial No. PCT/US2021/020120 (dated Jun. 1, 2021).
Notification of Transmittal of the International Search Report and the Written Opinion of the International Searching Authority, or the Declaration for U.S. Patent Application Serial No. PCT/US2021/020122 (dated Jun. 1, 2021).
Nokia et al., "Discussion paper on authorization for Model D Indirect communications", 3GPP TSG SA WG3; S3-194380 (Nov. 11, 2019).
Non-Final Office Action for U.S. Appl. No. 16/356,446 (dated Jun. 16, 2021).
Notice of Allowance and Fee(s) Due for U.S. Appl. No. 17/001,599 (dated May 17, 2021).
Applicant-Initiated Interview Summary for U.S. Appl. No. 17/001,599 (dated May 5, 2021).
Huawei, "eSBA: reselection of producer instance," 3GPP TSG-SA2 Meeting #132, pp. 1-2 (Apr. 12, 2019).
Docomo, "Update Solution 4 for implicit registration," SA WG2 Meeting #129, pp. 1-2 (Oct. 15-19, 2018).
Notification of Transmittal of the International Search Report and the Written Opinion of the International Searching Authority, or the Declaration for U.S. Patent Application Serial No. PCT/US2021/020121 (dated Jun. 1, 2021).
Notice of Allowance for U.S. Appl. No. 17/156,149 (dated May 24, 2022).
Advisory Action and Examiner-Initiated Interview Summary for U.S. Appl. No. 16/945,794 (dated May 20, 2022).
Notice of Allowance for U.S. Appl. No. 17/156,149 (dated Apr. 19, 2022).
Communication of European Publication Number and Information on the Applicatoin of Article 67(3) EPC for European Patent Application Serial No. 20732441.9 (dated Apr. 6, 2022).
Non-Final Office Action for Chinese Patent Application Serial No. 201980067968.7 (dated Mar. 3. 2022).
First Examination Report for Indian Patent Application Serial No. 202147011137 (dated Mar. 9, 2022).
Notice of Allowance and Fee(s) Due for U.S. Appl. No. 16/932,226 (dated Mar. 9, 2022).
Commonly-assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).
Notice of Allowance and Fee(s) Due for U.S. Appl. No. 17/001,599 (dated Nov. 17, 2021).
Notice of Allowance and Fee(s) Due for U.S. Appl. No. 16/356,446 (dated Sep. 30, 2021).
"Implementing Quality of Service Policies with DSCP," Cisco, pp. 1-7 (Feb. 15, 2008).
Notice of Allowance for U.S. Appl. No. 17/203,693 (dated Mar. 17, 2022).
Final Office Action for U.S. Appl. No. 16/945,794 (dated Feb. 8, 2022).
Non-Final Office Action for U.S. Appl. No. 17/082,871 (dated Feb. 7, 2022).
Commonly-Assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-assigned, co-pending U.S. Appl. No. 17/485,284 for "Methods, Systems and Computer Readable Media for Providing Priority Resolver for Resolving Priorities and Network Function (NF) Instances" (Unpublished, filed Sep. 24, 2021).
Notification of Transmittal of the International Search Report and the Written Opinion of the International Searching Authority, or the Declaration for International Application No. PCT/US2021/033031 (dated May 18, 2021).
Non-Final Office Action for U.S. Appl. No. 16/945,794 (dated Sep. 15, 2021).
Commonly-Assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).
Commonly-Assigned, co-pending U.S. Appl. No. 17/487,142 for "Methods, Systems, and Computer Readable Media for Network Function Discovery Using Preferred-Locality Information" (Unpublished, filed Sep. 28, 2021).
"TCP congestion control," Wikipedia, pp. 1-15 (Mar. 4, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
Commonly-assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

(56) References Cited

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

"3rd Generation Partnership Project; Technical Specification Group Services and System Aspects; Procedures for the 5G System (5GS); Stage 2 (Release 17)," 3GPP TS 23.502, V17.0.0, pp. 1-646.

Belshe et al., "Hypertext Transfer Protocol Version 2 (HTTP/2)," Internet Engineering Task Force (IETF), RFC 7540, pp. 1-96 (May 2015).

Vixie et al., "Dynamic Updates in the Domain Name System (DNS Update)," Network Working Group, RFC 2136, pp. 1-26 (Apr. 1997).

Commonly-Assigned, co-pending U.S. Appl. No. 17/746,895 for Methods, Systems, and Computer Readable Media for Facilitating Processing of Inter-Public Land Mobile Network (PLMN) Messages Related to Existing Subscriptions, (Unpublished, filed May 17, 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

Non-Final Office Action for U.S. Appl. No. 17/193,337 (dated May 11, 2022).

Commonly-assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).

Notice of Allowance for U.S. Appl. No. 16/942,713 (dated Nov. 29, 2021).

Notice of Allowance for U.S. Appl. No. 17/001,599 (dated Nov. 17, 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

Ex Parte Quayle Action for U.S. Appl. No. 16/942,713 (Sep. 13, 2021).

Commonly-assigned, co-pending U.S. Appl. No. 17/497,879 for "Methods, Systems, and Computer Readable Media for Routing Inter-Public Land Mobile Network (INTER-PLMN) Messages Related to Existing Subscriptions with Network Function (NF) Repository Function (NRF) Using Security Edge Protection Proxy (SEPP)," (Unpublished, filed Oct. 8, 2021).

Commonly-assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

\* cited by examiner

METHODS, SYSTEMS, AND COMPUTER READABLE MEDIA FOR SERVICE COMMUNICATIONS PROXY (SCP)-SPECIFIC PRIORITIZED NETWORK FUNCTION (NF) DISCOVERY AND ROUTING

TECHNICAL FIELD

The subject matter described herein relates to routing messages to producer NFs in 5G communications networks. More particularly, the subject matter described herein relates to methods, systems, and computer readable media for SCP-specific prioritized NF discovery and routing.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves into an IP address and port number on a network node that hosts a producer NF. An NF instance is an instance of a producer NF that provides one or more services, each provided by an NF service instance. An NF service instance is the entity within an NF instance that provides a given service. A given producer NF may include more than one NF instance, and an NF instance can include more than one service instance. It should also be noted that multiple NF instances and service instances can share the same service endpoint.

Producer NFs register with a network function repository function (NRF). The NRF maintains an NF or service profile of each available NF instance and the services supported by each NF instance. Consumer NFs can subscribe to receive information about producer NF instances that have registered with the NRF. An NF profile is a data structure maintained by the NRF identifying an NF instance and the services provided by the NF instance. An NF service profile is a data structure within the NF profile maintained by the NRF identifying an NF service instance and the service provided by the NF service instance.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

The service gateway is a node that sits in front of a group of producer NFs that provide a given service. The service gateway may load balance incoming service requests among the producer NF that provide the service in a manner similar to the SCP.

The service mesh is a name for a group of intermediate proxy nodes that enable communications between producer and consumer NFs. The service mesh may include one or more SCPs, SEPPs, and service gateways.

One problem that occurs in 5G communications networks is that the NRF is unable to return a list of NF profiles that are prioritized for individual SCPs based on each SCP's network condition with various producer NFs. For example, the NRF may receive a discovery request message from an SCP and may utilize a local policy of the NRF to set priorities of NF profiles in the list of NF profiles returned to the SCP in the discovery response. The priorities set by the NRF may not be optimal for the SCP, because the NRF does not have visibility of the latencies experienced by the SCP in communicating with producer NFs. As a result, if the consumer NF that ultimately receives the list of NF profiles relies solely on the NRF-specified producer NF selection priorities, the consumer NF may select a producer NF that is suboptimal in terms of latency.

In light of these difficulties, there exists a need for methods, systems, and computer readable media for SCP-specific prioritized NF discovery and routing.

SUMMARY

A method for service communications proxy (SCP)-specific prioritized producer network function (NF) discovery and routing includes maintaining, at the SCP, a producer NF latency database including SCP-specific producer NF latency information. The method further includes receiving, at the SCP, a discovery request message or receiving a service request message having a 3gpp-Sbi-Discovery header and generating, at the SCP, a discovery request message in response to the received service request message. The 3gpp-Sbi-Discovery header is defined in Section 5.2.3.2.7 of Third Generation Partnership Project (3GPP) Technical Specification (TS) 29.500. According to Section 5.2.3.2.7 of 3GPP TS 29.500, the 3gpp-Sbi-Discovery header is used to convey NF service discovery factors to the SCP in indirect communication models. In indirect communication models, consumer NFs communicate with producer NFs via the SCP instead of directly with the producer NFs. The presence of the 3gpp-Sbi-Discovery header in a service request message also indicates delegated discovery where the consumer NF delegates to the SCP the responsibility of sending a discovery request message to the NRF. The 3gpp-Sbi-Discovery header contains discovery parameters to be conveyed by the NF consumer to the SCP and is used by the SCP for finding a suitable NF producer instance, e.g. by performing the NF service discovery procedure with the NRF on behalf of the NF consumer in the case of indirect communication with the delegated discovery model.

If delegated discovery with indirect communication is indicated to the SCP by a received service request message, the method further includes having the SCP follow model D in Section E1 of 3GPP TS 23.501 and generate discovery request message using discovery parameters received in service request from consumer NF in delegated discovery mode. In either non-delegated or delegated discovery, the method further includes modifying, by the SCP, the discovery request message to include the SCP-specific producer NF latency information for at least one producer NF service instance capable of providing a service identified in the discovery request message. The method further includes forwarding, by the SCP, the discovery request message to an NF repository function (NRF). The method further includes, at the NRF, creating a list of NF and associated service profiles of producer NF instances and their respective producer NF service instances capable of providing the service identified in the discovery request message. The method further includes setting or adjusting, by the NRF and based on the SCP-specific producer NF latency information, priorities of NF profiles and associated NF service profiles of producer NF instances and their respective producer NF service instances in the list. The method further includes forwarding, by the NRF and to the SCP, a discovery response message including the list of NF and associated service profiles of producer NF instances and their respective producer NF service instances.

According to another aspect of the subject matter described herein, maintaining the producer NF latency database includes, for each producer NF service instance of each producer NF instance, calculating at least one roundtrip time indicating a roundtrip time for messaging between the SCP and the producer NF service instance.

According to another aspect of the subject matter described herein, calculating at least one roundtrip time includes calculating a transport roundtrip time using transport layer messaging between the SCP and each service instance of each producer NF instance, calculating a service messaging roundtrip time for service messaging between the SCP and the producer NF service instance, and determining, as a true roundtrip time, a maximum of the transport roundtrip time and the service messaging roundtrip time.

According to another aspect of the subject matter described herein, maintaining the producer NF latency database includes storing the true roundtrip time in the producer NF latency database.

According to another aspect of the subject matter described herein, maintaining the producer NF latency database comprises storing, for each producer NF service instance, an indicator as to whether a latency between the service instance of the producer NF instance and the SCP exceeds a threshold.

According to another aspect of the subject matter described herein, modifying the discovery request message to include the latency information includes adding the indicator to the discovery request message.

According to another aspect of the subject matter described herein, setting or adjusting the priorities of the NF and service profiles by the NRF includes increasing or decreasing the priorities of NF and service profiles corresponding to producer NF instances and producer NF service instances for which the indicator is present in the discovery request message.

According to another aspect of the subject matter described herein, modifying the discovery request message includes inserting the producer NF service instance latency information in a custom header of the discovery request message.

According to another aspect of the subject matter described herein, receiving a discovery request message or receiving a service request message comprises receiving a discovery request message, and the method for SCP-specific prioritized producer NF discovery and routing further comprises, at the SCP, in response to receiving the discovery response message, forwarding the discovery response message to a consumer NF.

According to another aspect of the subject matter described herein, receiving a discovery request message or a service request message comprises receiving a service request message and the method for SCP-specific producer NF discovery and routing further comprises, at the SCP, forwarding the service request message to one of the producer NF instances having a service profile in the list returned by the NRF in the discovery response message.

A system for service communications proxy (SCP)-specific prioritized producer network function (NF) discovery and routing includes an SCP including at least one processor. The system further includes an NF repository function (NRF) including at least one processor. The system further includes an SCP discovery/service request handler and database manager implemented by the at least one processor of the SCP for maintaining a producer NF latency database including SCP-specific producer NF service instance latency information, receiving a discovery request message or receiving a service request message having a 3GPP-Sbi-Discovery header and generating, at the SCP, a discovery request message in response to the received service request message, modifying the discovery request message to include the SCP-specific producer NF service instance latency information for at least one producer NF service instance capable of providing a service identified in the discovery request message, and forwarding the discovery request message to the NRF. The system further includes an NRF discovery request handler implemented by the at least one processor of the NRF for creating a list of NF and associated service profiles of producer NF instances and their respective producer NF service instances capable of providing the service identified in the discovery request message, setting or adjusting, by the NRF and based on the SCP-specific producer NF latency information, priorities of producer NF and producer NF service profiles of producer NF and producer NF service instances in the list; and forwarding, by the NRF and to the SCP, a discovery response message including the list of NF and associated service profiles of producer NF instances and their respective producer NF service instances.

According to another aspect of the subject matter described herein, the SCP discovery/service request handler and database manager is configured to, in maintaining the producer NF latency database, for each producer NF service instance, calculate at least one roundtrip time indicating a roundtrip time for messaging between the SCP and the producer NF service instance.

According to another aspect of the subject matter described herein, the SCP discovery/service request handler and database manager is configured to, in calculating the at least one roundtrip time:
  calculate a transport roundtrip time using transport layer messaging between the SCP and the service instance of the producer NF instance;
  calculate a service messaging roundtrip time for service messaging between the SCP and the service instance of the producer NF instance; and
  determine, as a true roundtrip time, a maximum of the transport roundtrip time and the service messaging roundtrip time.

According to another aspect of the subject matter described herein, the SCP discovery/service request handler and database manager is configured to, in maintaining the producer NF latency database, store the true roundtrip time in the producer NF latency database.

According to another aspect of the subject matter described herein, the SCP discovery/service request handler and database manager is configured to, in maintaining the producer NF latency database, store, for each service instance(s) of producer NF instance, an indicator as to whether a latency between the service instance of producer NF instance and the SCP exceeds a threshold.

According to another aspect of the subject matter described herein, the SCP discovery/service request handler and database manager is configured to, in modifying the discovery request message to include the latency information, add the indicator to the discovery request message, and, in setting or adjusting the priorities of the NF and service profiles for which the indicator is present in the discovery request message, the NRF discovery request handler is configured to increase or decrease the priorities of the producer NF and service profiles.

According to another aspect of the subject matter described herein, the SCP discovery/service request handler and database manager is configured to, in modifying the discovery request message, insert the SCP-specific producer NF service instance latency information in a custom header of the discovery request message According to another aspect of the subject matter described herein, receiving a discovery request message or receiving a service request message comprises receiving a discovery request message and the SCP discovery/service request handler and database manager is configured to:

in response to receiving the discovery response message, forward the discovery response message to a consumer NF;

receive, from the consumer NF, a service request message addressed to one of the service instances of the producer NF instances having a service profile in the list; and forward the service request to the producer NF service instance.

According to another aspect of the subject matter described herein, receiving a discovery request message or a service request message comprises receiving a service request message and the SCP discovery/service request handler and database manager is configured to forward the service request message to one of the producer NF service instances having a service profile in the list returned by the NRF in the discovery response message.

A non-transitory computer readable medium having stored thereon executable instructions that when executed by a processor of a computer control the computer to perform steps is provided. The steps include maintaining, at a service communications proxy (SCP), a producer NF latency database including SCP-specific producer network function (NF) latency information. The steps further include receiving, at the SCP, a discovery request message or receiving a service request message having a 3GPP-Sbi-Discovery header and generating, at the SCP, a discovery request message in response to the received service request message. The steps further include modifying, by the SCP, the discovery request message to include the SCP-specific producer NF latency information for at least one service instance of producer NF instance capable of providing a service identified in the discovery request message. The steps further include forwarding, by the SCP, the discovery request message to an NF repository function (NRF). The steps further include creating, at the NRF, a list of NF and associated service profiles of producer NF instances and their respective producer NF service instances capable of providing the service identified in the discovery request message. The steps further include setting or adjusting, by the NRF and based on the SCP-specific producer NF latency information, priorities of NF and service profiles of producer NF and producer NF service instances in the list. The steps further include forwarding, by the NRF and to the SCP, a discovery response message including the list of NF and service profiles of producer NF instances and their respective producer NF service instances.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
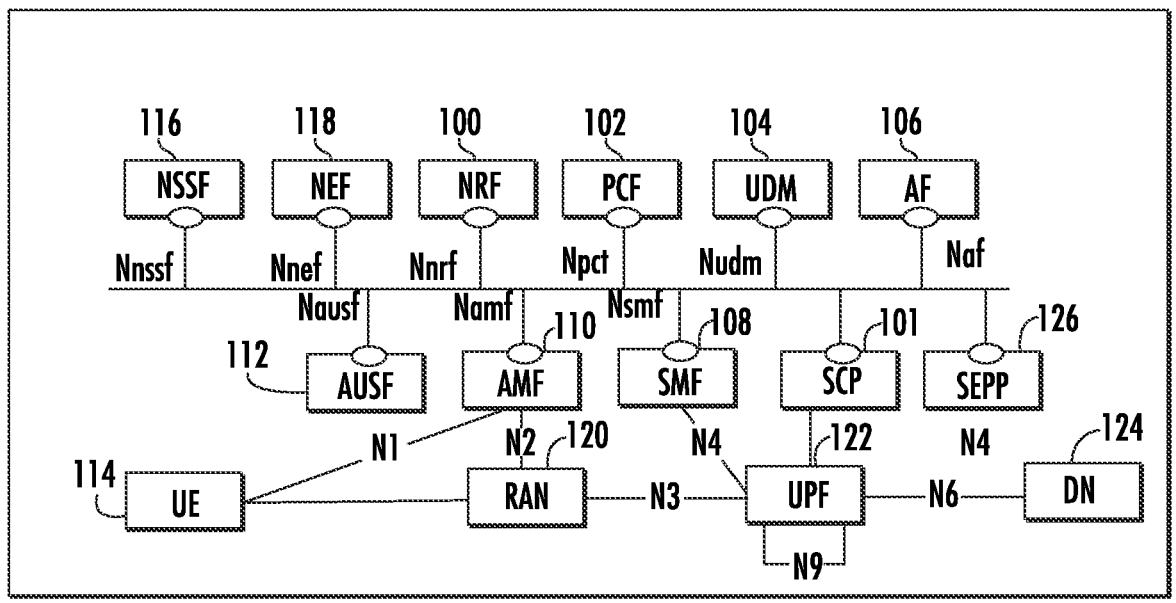
FIG. 1 is a network diagram illustrating an exemplary 5G network architecture.

The subject matter described herein relates to methods, systems, and computer readable media for SCP-specific prioritized NF discovery and routing using an SCP and an NRF. The subject matter may be implemented in a 5G system network architecture or a network architecture that includes both 5G and non-5G network elements. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. SCP 101 may perform load balancing of connections between consumer and producer NFs. In addition, using the methodologies described herein, SCP 101 may perform preferred NF location based selection and routing.

NRF 100 is a repository for NF profiles and their associated NF service instance profiles. In order to communicate with a producer NF, a consumer NF or an SCP must obtain the NF profile from NRF 100. The NF profile is a JavaScript object notation (JSON) data structure defined in Third Generation Partnership Project (3GPP) Technical Specification (TS) 29.510. The NF profile definition includes at least one of a fully qualified domain name (FQDN), an Internet protocol (IP) version 4 (IPv4) address or an IP version 6 (IPv6) address.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As stated above, in 5G networks, one problem is that NRFs are not capable of returning lists of NF profiles that are prioritized in a manner that is specific to an SCP. In the 5G network architecture, one of the most crucial jobs of the NRF is to perform NF discovery and return responses to consumer NFs. The procedure for processing discovery requests is described in 3GPP TS 29.510. In a discovery request, the consumer NF provides a set of parameters. The NRF uses the consumer provided parameters and profile data published by producer NFs to generate a discovery response that may contain zero or more NF profiles matching the criteria specified by the consumer NF. 3GPP TS 29.510 mentions the following for priority parameters in the NF profile and NF service object:

The NRF may overwrite the received priority value when exposing an NF profile with the NRF_NF discovery service.

Thus, in the discovery response, the NRF may manipulate parameters, such as priority, based on the local policy or external factors. The NRF returns the priority parameters to the consumer NF in a discovery response. Based on the priority parameters in the response, the consumer NF may select a producer NF instance and then an associated producer NF service instance. Priority and capacity parameters are used as indicators by the consumer NF to select a producer NF instance and a producer NF service instance. Therefore, the NRF plays a vital role that establishes the consumer NF-producer NF relationship in 5G networks. 3GPP specifications 23.501 and 23.502 provide guidelines to enable routing between consumer and producer NFs for the SCP. In particular, 3GPP TS 23.501 provides communication models through the SCP. Section 4.17 of 3GPP TS 23.502 provides the NF service framework.

Even though the NRF is capable of setting priority parameters in NF profiles returned to the consumer NF, the NRF has no way to know what priority may be optimal for a given SCP or consumer NF.

Figure 2:
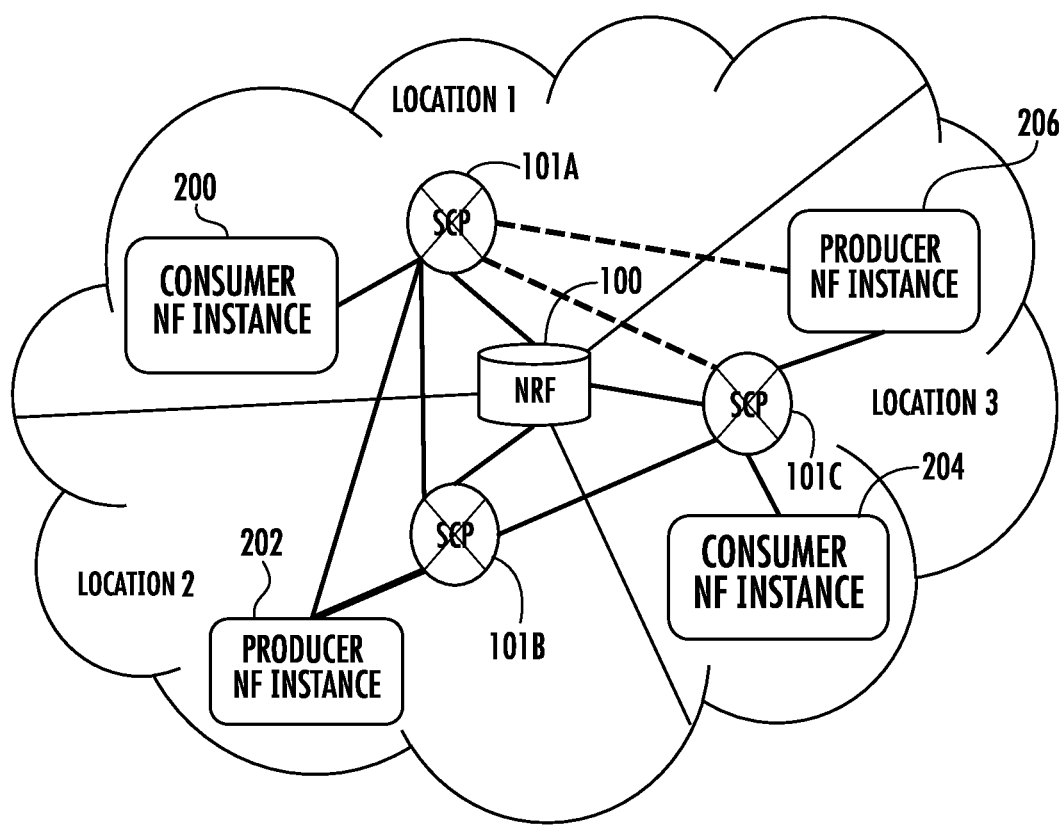
FIG. 2 is a network diagram illustrating a problem that occurs when an NRF lacks the ability to return an optimal list of NF profiles to an SCP.

FIG. 2 illustrates this problem in more detail. In FIG. 2, an SCP 101A serves location 1, an SCP 101B serves location 2, and an SCP 101C serves location 3. NRF 100 responds to the discovery requests from each of locations 1, 2, and 3. In this example, consumer NF 200 resides in location 1, producer NF 202 resides in location 2, and producer NFs 204 and 206 reside in location 3.

In FIG. 2, different consumer NFs located in different regions or locations have different latency numbers for a set of producer NFs available in local or remote locations. NRF 100 has no way to determine the network behavior between consumer NFs and producer NFs. Thus, a local policy set by NRF 100 will be less than optimal to guide a consumer NF in a given location to select a given producer NF.

In the example in FIG. 2, producer NFs 202, 204, and 206 may register with NRF 100 with the same priority value, i.e., 1, and capacity. This means that consumer NF 200 in location 1 is allowed to select producer NFs in locations 2 and 3 uniformly. However, due to the underlying IP network, traffic between location 1 and location 3 may experience high latency, for example, caused by TCP packet dropping and retransmission. Thus, the throughput for a consumer NF 200 in location 1 will be much lower when consuming services of producer NF 206 in location 3 than when consuming services of producer NF 202 in location 2.

According to the subject matter described herein, the SCP, being an intermediate node, can track latency and roundtrip time numbers of a given service endpoint and service instance and provide this information to the NRF to set or adjust priority parameters accordingly. According to 3GPP TS 29.510, the priority parameter is an optional parameter in the NF profile. Accordingly, the NRF described herein may either set priority parameters based on received latency information if a priority parameter is not present in an NF and/or service profile or adjust a priority parameter if the priority parameter is present in the NF and/or service profile.

Such priority parameters will be provided by NRF 100 to consumer NFs via their local SCP, and the consumer NFs may use the SCP or region-specific priority parameters to select the producer NF and associated producer NF service instance with the lowest latency to provide a given service. When an SCP receives a service request, the SCP can enable reselection of a producer NF locally, but such reselection is undesirable as it adds latency to the processing of service request. Thus, the subject matter described herein reduces the likelihood of reselection by returning in a discovery response message priority values that are set or adjusted based on latency information received from an SCP in a discovery request.

Figure 3:
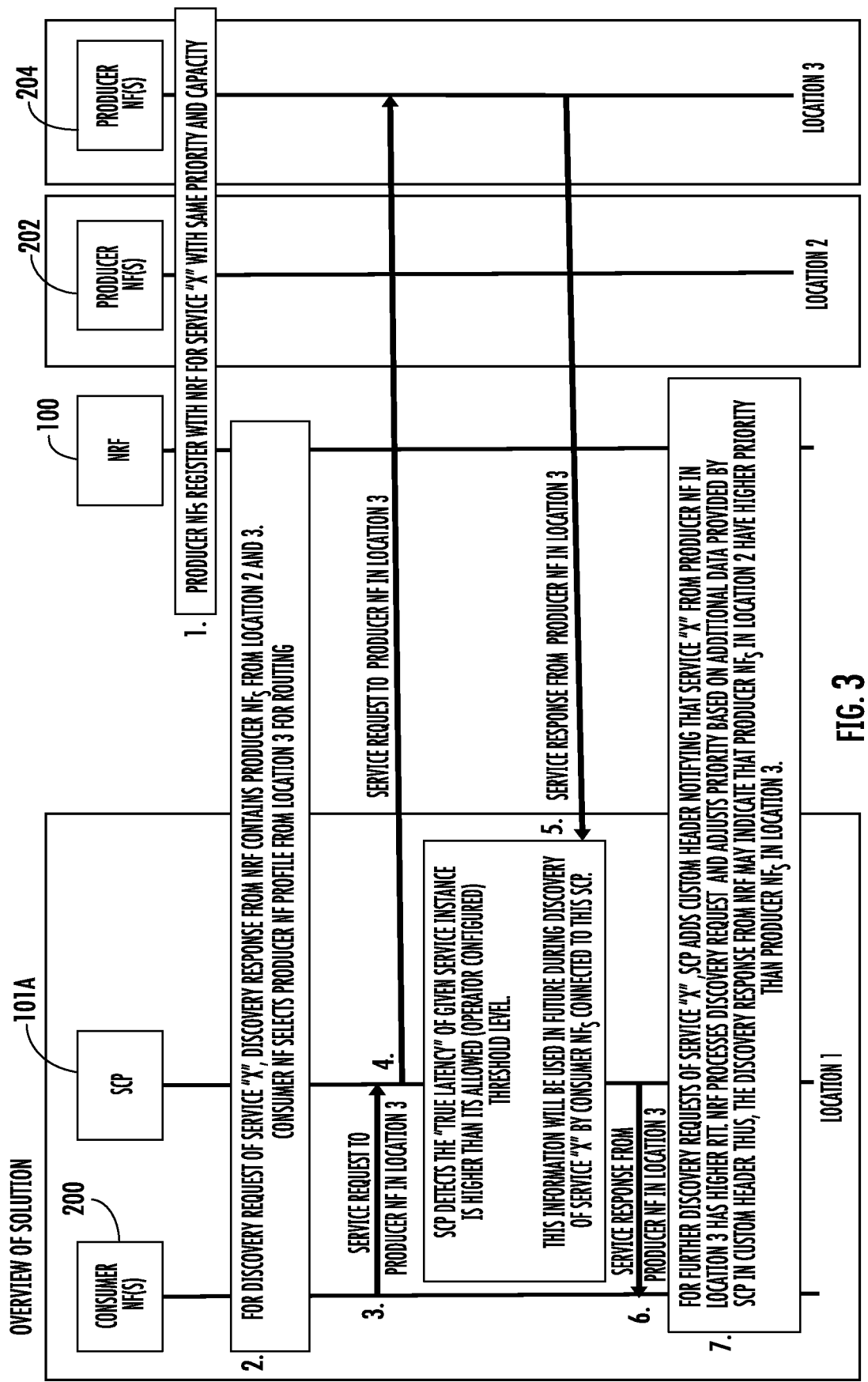
FIG. 3 is a message flow diagram illustrating exemplary messaging between consumer NFs, an SCP, an NRF for SCP-specific prioritized NF discovery and routing using an SCP and an NRF.

FIG. 3 is a message flow diagram illustrating exemplary messaging for SCP-specific prioritized NF discovery and routing. Referring to FIG. 3, in line 1, producer NFs 202 and 204 register with NRF 100 to provide service X with a given priority and capacity. In line 2, a consumer NF 200 sends a discovery request for a service X to NRF 100. NRF 100 responds to the discovery request with a list of NF profiles of producer NFs from location 2 and location 3 capable of providing the service. Consumer NF 200 selects a producer NF in location 3 for providing the service.

In line 3 of the message flow diagram, consumer NF 200 sends a service request to SCP 101A requesting service from a producer NF in location 3. In line 4 of the message flow diagram, SCP 101A sends a service request to producer NF 204 in location 3. In line 5 of the message flow diagram, producer NF 204 in location 3 sends a response to the service request to the consumer NF 200 via SCP 101A. SCP 101A determines the true latency of a given service instance and that the latency is higher than an operator configured threshold level. This information will be used by SCP 101A by future discovery for service X by consumer NFs in location 1 connected to SCP 101A. In line 6, SCP 101A sends the service response from a producer NF 204 in location 3 to consumer NF 200.

In line 7 of the message flow diagram, for future discovery requests for service X, SCP 101A may add a custom header notifying NRF 100 that service X from a producer NF in location 3 has a roundtrip time that exceeds the threshold. NRF 100 may process the discovery request and set or adjust the priority of NFs based on the additional data provided by SCP 101A in the custom header. Thus, the discovery response from the NRF may contain producer NFs in location 2 having a lower priority value (which according to 3GPP TS 29.510 indicates higher selection likelihood) than producer NFs in location 3.

Because SCP 101A maintains context about latency of producer NFs and associated producer NF service instances, SCP 101A can utilize this context to facilitate prioritized routing by communicating the context to NRF 100. Such utilization is illustrated by line 7 of the message flow diagram where, when SCP 101A receives or generates (in the case of delegated discovery as described above) further discovery requests for service X, SCP 101A adds a custom header notifying or indicating to NRF 100 that a given instance of service X from a given producer NF in location 3 has a roundtrip time (RTT) that exceeds a threshold. SCP 101A forwards this discovery request to NRF 100. NRF 100 processes the discovery request and adjusts priorities of NF and service profiles in the list that is returned in response to the discovery request based on the custom headers. In the example illustrated in FIG. 3, the discovery response would indicate that for service X, producer NFs from location 2 would have lower priority (a higher priority indicates a reduced likelihood of selection) than producer NFs in location 3. Utilizing such a system, the consumer NFs can send a service request to service instance of producer NFs that provide the lowest latency for a given service where the latency is measured with respect to the consumer NFs, and the SCP is not required to provide a re-selection service, which could result in processing delay of the service request.

For a given producer NF instance, more than one instance of the same or different service may share a given endpoint (i.e., when NF services have a common API gateway as their exposure point). Should the NRF adjust priority of all service instances that are hosted on a given endpoint?

When more than one service exposes same endpoint (e.g. API gateway), then the SCP cannot detect if response latency from an endpoint is due to a particular service behavior (behind an API gateway or common backend address) or due to the network.

Socket APIs however provide the RTT value of a socket through programming interfaces, e.g., struct tcp_info ti;
socklen_t tisize=sizeof(ti);
getsockopt(fd, IPPROTO_TCP, TCP_INFO, &ti, &tisize);

rtt-estimation is in ti.tcpi_rtt and ti.tcpi_rttvar has smoothed mean deviation measured in microseconds. For application (ti.tcpi_rttvar) is considered to track connection RTT.

Thus, if RTT on a socket interface, i.e., transport layer interface, indicates network latency, then all services hosted on that endpoint address should have higher priority values, which indicates lower likelihood of selection by a consumer NF.

However, if transport RTT is within limits but hypertext transfer protocol (HTTP) request/response has higher RTT, then that particular service+endpoint should have higher priority values.

As discussed above, an endpoint may host one or more service instances of a NF instance. It is also possible that an SCP may set up more than one connection with an endpoint (for performance or other local policy reasons).

An SCP as described herein may calculate the true RTT of a service instance, where the true RTT is calculated as follows.

MAX(RTT of service instance, RTT of transport to service instance)

RTT of service instance may be calculated as follows:
1. Track RTT of HTTP service messages (difference between response time and request time) for an endpoint of a given service instance.
2. Calculate smoothing average of RTT.

The smoothing average may be calculated using any suitable averaging algorithm and the subject matter described herein is not limited to any particular implementation logic for calculating the smoothing average. In one example, the smoothing average could be calculated using the algorithm described at the following link:

https://mahifx.com/mfxtrade/indicators/smoothed-moving-average-smma

The RTT of transport may be calculated as follows:
HTTP PING and TCP keep-alive messages will help keep the transport
  RTT updated with a given endpoint.
  When the SCP has single connection with an endpoint:
    Track tcpi_rttvar (described above) is used as the RTT of connection
  When SCP has multiple connections with an endpoint
    If SCP supports routing based on the connection with the lowest RTT:
      RTT=MIN (tcpi_rttvar for each connection on endpoint)
    else
      Track tcpi_rttvar (described above) as RTT for each connection on an endpoint
      RTT=Sum of reported RTT on all connections of an endpoint/# of connections for that endpoint Table 1 shown below illustrates an example of producer NF instance information that may be maintained by SCP 101A.

TABLE 1

Producer NF Instance Maintained by an SCP

| Service Name | Nf instance id (as in Nf profile) | Service Instance Id (as in Nf profile) | Endpoint(s) |
|---|---|---|---|
| nudm-sdm | NfID1 | ID1 | Sdm1.udm1.com, 100.10.3.10 |
| nudm-sdm | NfID2 | ID2 | Sdm2.oracle.com |
| nudm-sdm | NfID3 | ID3 | 100.10.2.4 |
| nudm-uecm | NfID3 | ID4 | 100.10.2.4 |
| nudm-uecm | NfID4 | ID5 | 100.10.3.4, 100.10.4.4 |
| nudm-uecm | NfID4 | ID6 | 100.20.20.20 |

In Table 1, the list of services and details that are known to SCP 101A are as follows:
  Nudm-sdm ID1 has FQDN and IP published
  Nudm-sdm ID2 has FQDN only
  Nudm-sdm ID3 and ID4 has IP only
  Nudm-sdm ID3 and Nudm-uecm ID4 are part of same NF profile i.e. NfID3 and has same IP address
  Nudm-uecm ID5 instance has 2 IP endpoints published
  Nudm-uecm ID6 instance has IP endpoint to which SCP is not connected yet
  Nudm-uecm ID5 and ID6 are two different service instance of same service and are also part of same NF profile i.e. NfID4

Tables 2A and 2B respectively illustrate the request response roundtrip time and transport roundtrip time that is measured by SCP 101A.

TABLE 2A

Request response roundtrip time calculated by SCP

| Service Instance Id | RTT (in μsec) |
|---|---|
| ID1 | 100 |
| ID2 | 350 |
| ID3 | 0 |
| ID4 | 600 |
| ID5 | 200 |
| ID6 | 0 |

TABLE 2B

Transport layer roundtrip time calculated by SCP

| Endpoint | RTT (in μsec) |
|---|---|
| 100.10.3.10 | 80 |
| 100.20.3.10 (sdm2.oracle.com) | 300 |
| 100.10.2.4 | 500 |
| 100.10.3.4 | 700 |
| 100.10.4.4 | 400 |
| 100.20.20.20 | 0 |

Tables 2A and 2B contain latency information that may be calculated by SCP 101A during message processing. The specific algorithms for calculating the request response and transport roundtrip time are described above.

Table 3 shown below illustrates the roundtrip time data that may be maintained by SCP 101A and used to formulate discovery request messages to NRF 100.

TABLE 3

True roundtrip time calculated by SCP

| Service Name | Nf instance id | Service instance Id | RTT | Unhealthy | Comments |
|---|---|---|---|---|---|
| nudm-sdm | NfID1 | ID1 | 100 | N | HTTP RTT is greater than transport RTT |
| nudm-sdm | NfID2 | ID2 | 350 | N | HTTP RTT is greater than transport RTT |
| nudm-sdm | NfID3 | ID3 | 500 | Y | Transport RTT is greater than HTTP RTT |
| nudm-uecm | NfID3 | ID4 | 600 | Y | HTTP RTT is greater than transport RTT |
| nudm-uecm | NfID4 | ID5 | 550 | Y | Average of transport RTT is greater than HTTP RTT. This is possible when network is getting congested or smoothing average of HTTP is yet to catch up the transport RTT |
| nudm-uecm | NfID4 | ID6 | 0 | N | |

In Table 3, the true roundtrip time calculated by SCP 101A is illustrated. The operator configured threshold for roundtrip time in FIG. 3 is 400 microseconds. Any producer NF whose roundtrip time exceeds the threshold is marked as unhealthy.

At the SCP:
The following operator configuration is required for RTT thresholding at SCP instance:
  Acceptable threshold level of RTT (in micro-seconds).
    If service RTT is greater than the configured/acceptable threshold, then that service instance is marked for lower latency.
  HTTP2 ping duration.
    When no service message is in progress with an service instance, HTTP2 Ping allows SCP to capture endpoint latency at Open Systems Interconnect (OSI) layer 7.
Based on discussions above, track "true RTT" of known service instances.
  For service instances with no transport connection, consider RTT as 0.
Create a list of service instances that have "true RTT">operator configured acceptable threshold.

Endpoint is removed from high RTT list (i.e. list maintained above) when "true RTT"<=operator configured acceptable threshold.

See algorithm below to add custom-header(s) to discovery request.

This is to provide guidance to the NRF on which NF profiles should be marked for lower likelihood of selection (indicated by higher priority values).

At NRF:

See algorithm described below that covers following points in detail:

Based on discovery parameter, generate list of viable NF profiles;

Reorder priority of services instances that matches with endpoints provided by SCP in custom header; and Return resulting NF profiles in discovery response.

Figure 4:
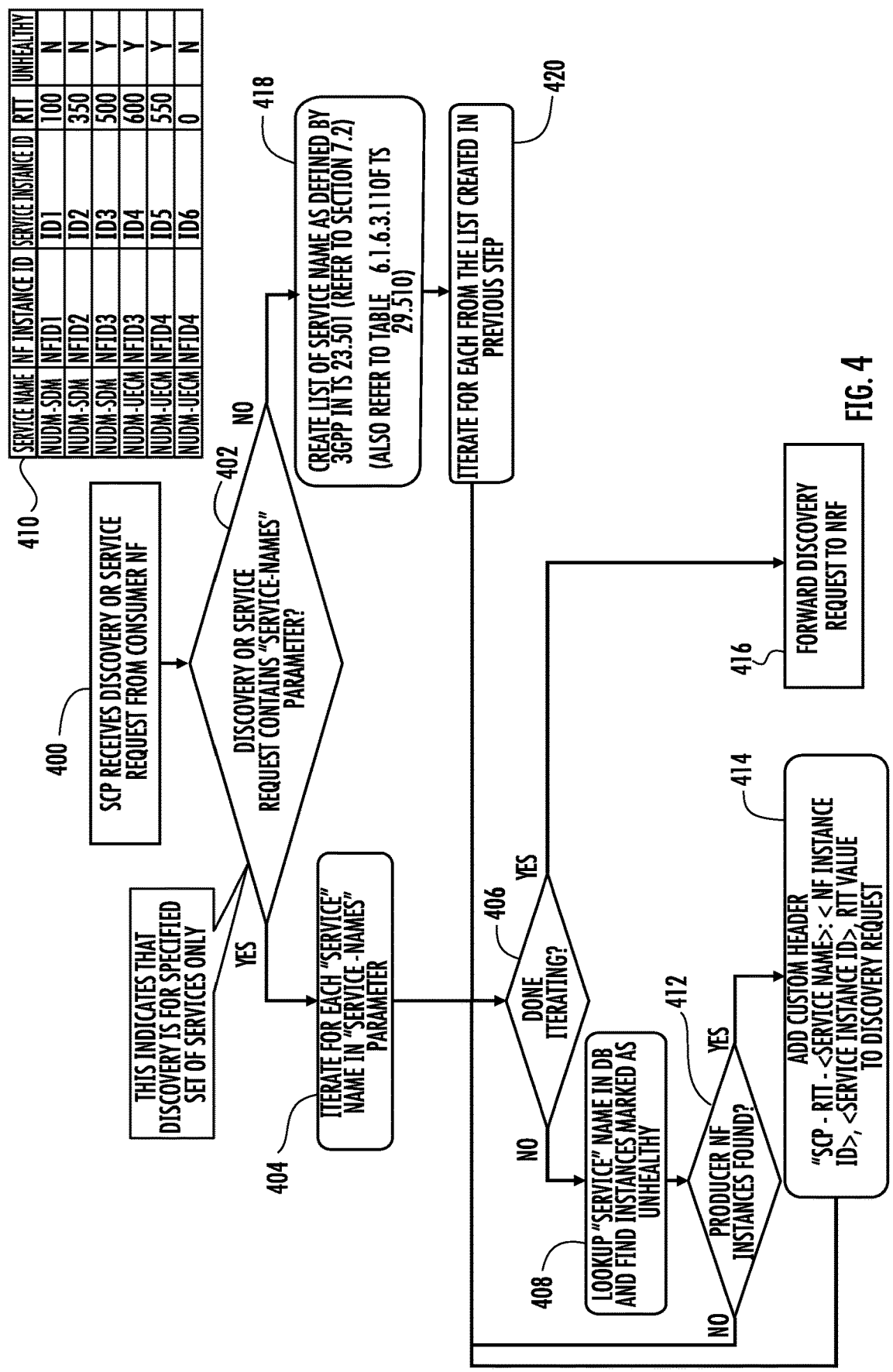
FIG. 4 is a flow chart illustrating an exemplary SCP algorithm for formulating a discovery request that includes SCP-specific producer NF service instance latency information and communicating the discovery request to the NRF.

FIG. 4 is a flow chart illustrating an exemplary algorithm performed by SCP 101A in processing a discovery request. Referring to FIG. 4, in step 400, the SCP receives a discovery or service request from a consumer NF. The SCP may receive a discovery request in the case of non-delegated discovery. The SCP may receive a service request with the 3gpp-Sbi-Discovery header in the case of delegated discovery and may generate a discovery request on behalf of the consumer NF. In step 402, SCP 101A determines whether the discovery or service request includes a service names parameter. If the discovery or service request includes a service names parameter, control proceeds to step 404 where SCP 101A iterates for each service name identified in the service names parameter. In step 406, SCP 101A determines whether the iteration through the list of service names is complete. If the iteration is not complete, control proceeds to step 408 where SCP 101A performs a lookup in producer NF latency database 410, which contains the same data illustrated in Table 3 to determine whether a producer NF instance matching the service name is found. In step 412, if a producer NF instance is found, control proceeds to step 414 where SCP 101A adds a custom header to the discovery request message identifying the service instance(s) of the producer NF instance as having latency that exceeds a threshold. Control then returns to step 406 where SCP 101A determines whether the iteration through the list of service names is complete. If the iteration is complete, control proceeds to step 416 where the SCP sends the discovery request to the NRF.

Returning to step 402, if the discovery or service request does not contain a service names parameter, control proceeds to step 418 where SCP 101A creates a list of service names as defined in 3GPP TS 23.501, Section 7.2 and Table 6.1.6.3.11 of 3GPP TS 29.510. Control then proceeds to step 420 where the SCP iterates through every service name in the list and then to steps 406 through 416 where SCP 101A adds custom headers to the discovery request that identifies service instance(s) of producer NF instances with latencies that exceed an operator defined threshold.

For example, for a consumer NF requesting nudm-sdm service, the SCP will add the following custom header values:

SCP-RTT-nudm-sdm: Nfid3, ID3, 500

For a consumer NF requesting a UDM NF type, the SCP will add the following custom header values:

SCP-RTT-nudm-sdm: Nfid3, ID3, 500
SCP-RTT-nudm-uecm: Nfid3, ID4, 600
SCP-RTT-nudm-uecm: Nfid4, ID5, 550

Figure 5:
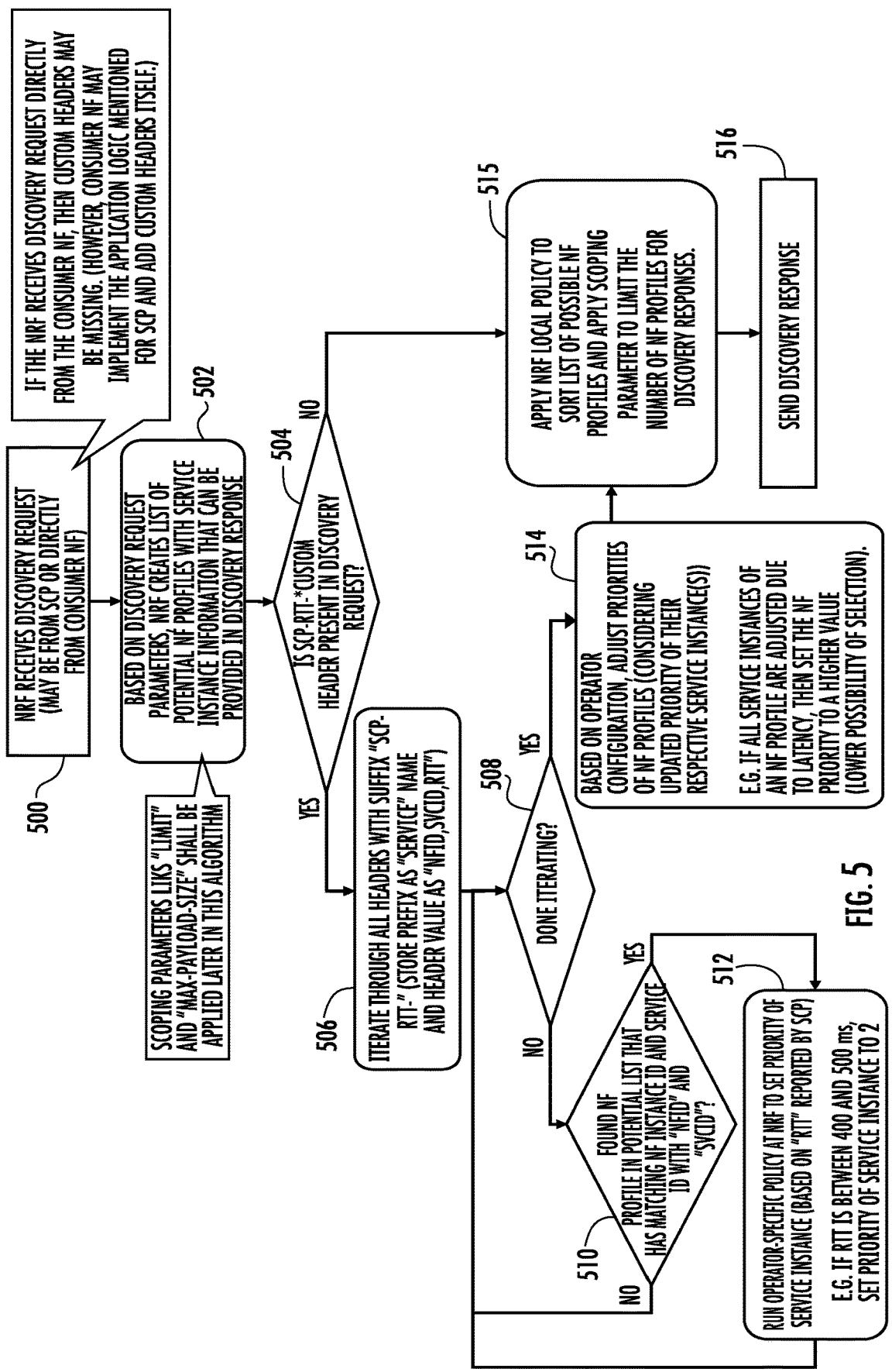
FIG. 5 is a flow chart illustrating an exemplary NRF algorithm for processing discovery requests received from an SCP where the discovery requests include SCP-specific producer NF service instance latency information.

FIG. 5 illustrates an exemplary NRF algorithm that may be performed in NRF 100 in processing a discovery request that includes SCP specific producer NF latency information. Referring to FIG. 5, in step 500, NRF 100 receives a discovery request from the SCP or from a consumer NF. If the discovery request comes from a consumer NF, the custom headers identifying producer NF service instance latency may be missing. However, a consumer NF may add such a list to a discovery request in the same manner described herein for the SCP.

In step 502, based on the discovery request, NRF 100 creates a list of potential NF profiles with service instance information that can be provided in a discovery response. Scoping parameters such as limit or max payload size can be used to create the list.

In step 504, NRF 100 determines whether the SCP roundtrip time custom header is present in the discovery request. If the SCP roundtrip time custom header is present, control proceeds to step 506 where NRF 100 iterates through all of the SCP-roundtrip time headers. In step 508, NRF 100 determines whether iterating through the list of headers is complete. If iterating through the list of headers is not complete, control proceeds to step 510 where NRF 100 determines whether it has located an NF profile in the potential list that has an NF instance ID and a service ID that matches the NF instance ID and service ID of one of the custom SCP roundtrip time headers. If a matching NF profile is located, control proceeds to step 512 where the NRF runs an operator-specific policy to set the priority of that service instance based on the roundtrip times reported by the SCP. For example, if the roundtrip time is between 400 and 500 ms, the priority of the service instance may be set to 2.

Returning to step 504, if there are no SCP roundtrip time custom headers in the discovery request, control proceeds to step 514 where NRF 100 applies a local policy to sort and set priorities for the list of NF profiles. NRF 100 may also apply scoping parameters to limit the number of NF profiles for the discovery response. In step 516, the NRF sends the discovery response.

Returning to step 508, if NRF 100 has completed iterating through the list of SCP roundtrip time headers, control proceeds to step 514 where NRF 100, based on operator configuration, adjusts the priority of the NF profiles (considering the updated priorities of their respective service instance(s)). For example, if all service instances of an NF profile are adjusted due to latency, then set the NF priority to a higher value (lower possibility of selection). In step 515, NRF 100 applies the local policies to limit the list of NF profiles, but the list will have priorities adjusted based on the roundtrip times communicated by the SCP. Control then proceeds to step 516 where NRF 100 sends the discovery response to the SCP.

Figure 6:
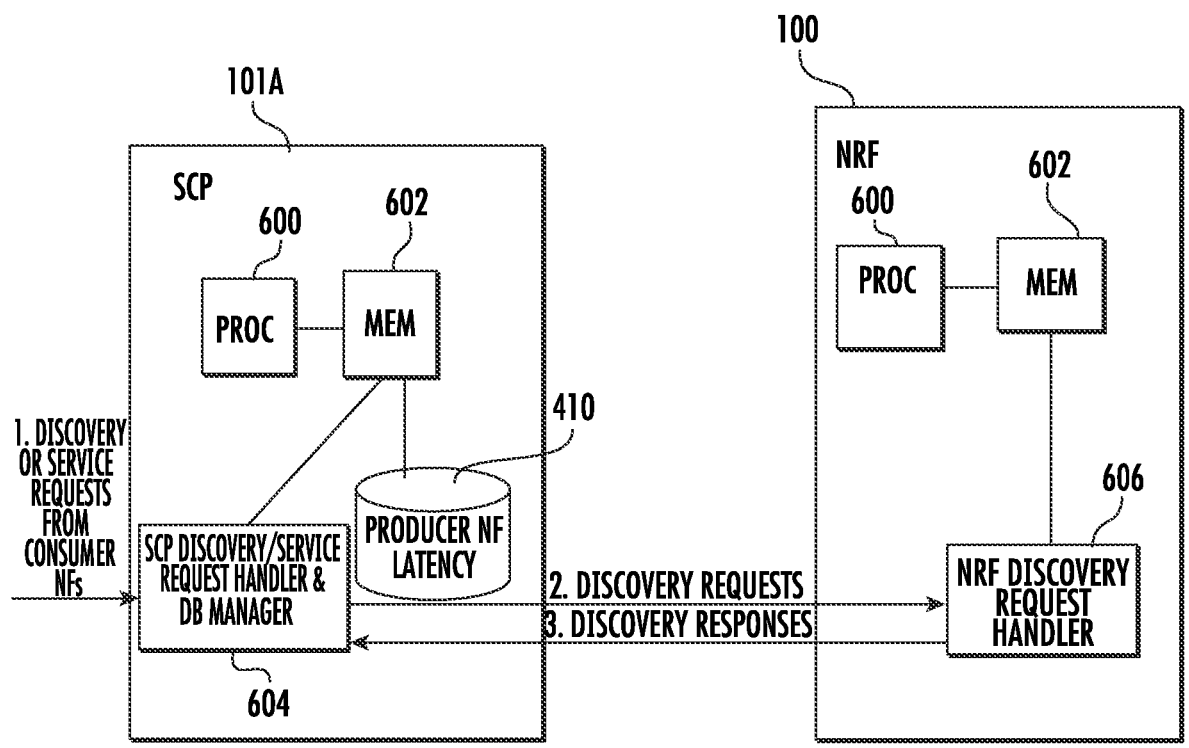
FIG. 6 is a block diagram illustrating an SCP and an NRF including components for SCP-specific prioritized NF discovery and routing.

FIG. 6 is a block diagram illustrating an exemplary SCP and NRF capable of performing the steps described herein for SCP-specific prioritized NF discovery and routing. Referring to FIG. 6, SCP 101A and NRF 100 each include at least one processor 600 and a memory 602. SCP 101A further includes producer NF latency database 410 that stores SCP-specific producer NF latency information calculated by SCP 101A. Producer NF latency database 410 may reside in memory 602 of SCP 101A. SCP 101A further includes an SCP discovery/service request handler and database manager 604 that processes discovery and service requests from consumer NFs. For the case of non-delegated discovery, SCP discovery/service request handler and database manager 604 modifies the received or generated discovery requests to include SCP-specific producer NF service instance latency information. SCP discovery/service request handler and database manager 604 also maintains the latency information in database 410. SCP discovery/service request handler and database manager 604 may be implemented by computer executable instructions stored in memory 602 of SCP 101A and that are executed by processor 600 of SCP 101A.

As stated above, SCP 101A maintains producer NF service instance latency information from the perspective of SCP 101A and different SCPs may maintain different sets of producer NF service instance latency information. As a result, the problems described above with regard to FIG. 2 and NRF cannot determine which producer NF is optimal for a given SCP/service region can be avoided. In addition, endpoints that have high latency with respect to some SCPs may have low latency for communications with other SCPs. The selection priorities of the endpoints are adjusted on an SCP-specific basis. As are result, endpoint utilization is improved over an implementation where endpoint latency is maintained globally or not at all.

NRF 100 includes NRF discovery request handler 606 that receives discovery requests, parses the discovery requests for producer NF service instance latency information, and formulates discovery response messages to prioritize NF profiles of endpoints using the SCP-specific producer NF service instance latency information. Thus, NRF discovery request handler 606 generates lists of producer NF profiles including producer NF service instance profiles with priorities that are SCP-region specific in terms of latency. NRF discovery request handler 606 may be implemented by computer executable instructions that are stored in memory 602 of NRF 100 and executed by processor 600 of NRF 100.

Figure 7:
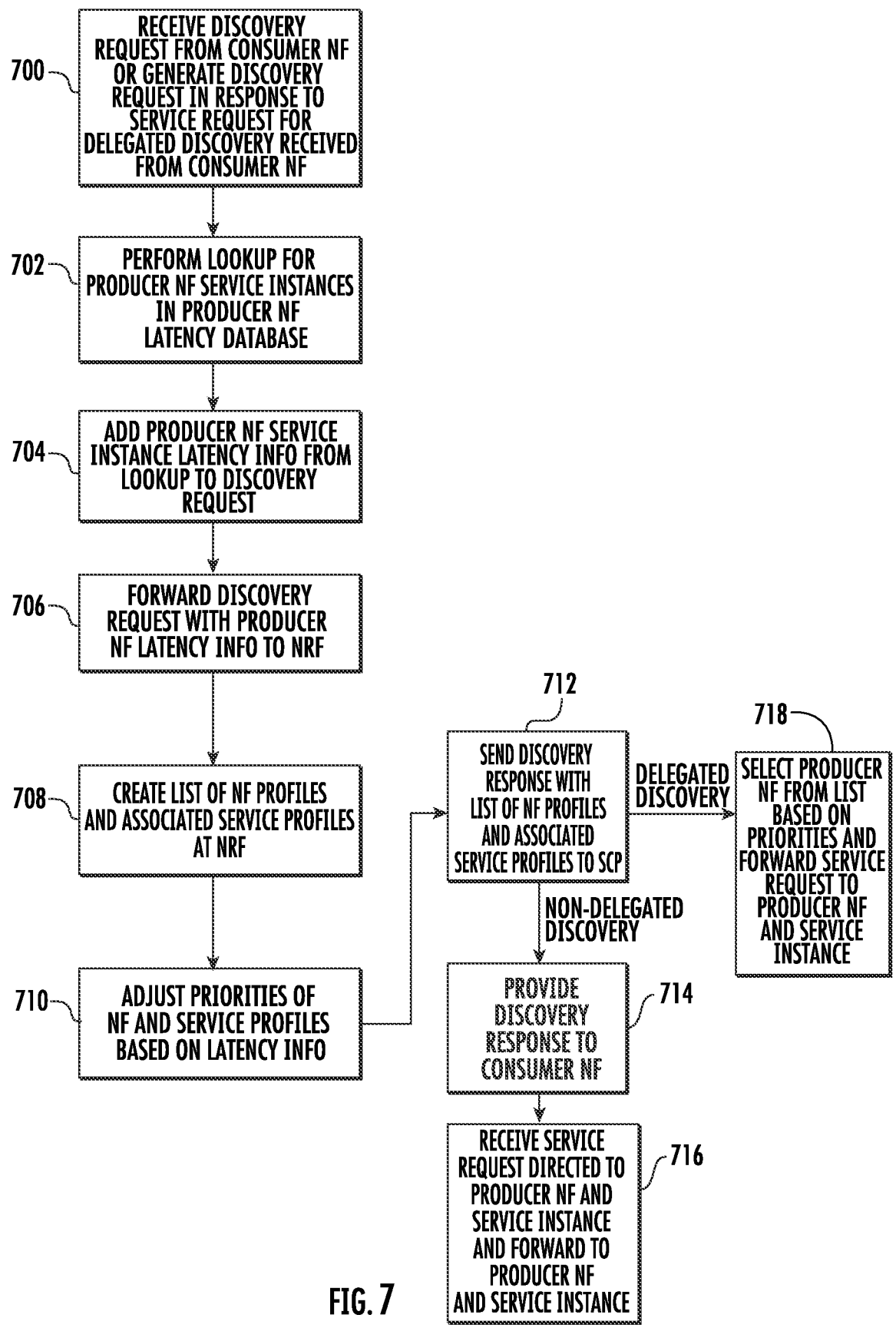
FIG. 7 is a flow chart illustrating an exemplary process for SCP-specific prioritized NF discovery and routing.

FIG. 7 is a flow chart illustrating an exemplary process performed by SCP 101 and NRF 100 in performing SCP-specific prioritized NF discovery and routing as described herein. Referring to FIG. 7, in step 700, a discovery request is received from a consumer NF or a discovery request is generated in response to a service request for delegated discovery received from a consumer NF. The discovery or service request may identify at least one service for which NF discovery is being requested.

In step 702, a lookup is performed in the producer NF latency information database. For example, SCP 101 may perform a lookup in database 410 for each service identified in the discovery or service request.

In step 704, producer NF service instance latency information resulting from the lookup is added to the discovery request. For example, SCP 101 may add custom headers to the discovery request that identify each service instance of each producer NF instance whose latency exceeds the operator defined threshold based on the lookup in producer NF latency database 410.

In step 706, the discovery request with the producer NF service instance latency information is forwarded to the NRF. For example, SCP 101 may forward the modified discovery request to NRF 100.

In step 708, a list of NF profiles (and associated service profiles) is created at the NRF using the producer NF service instance latency information provided in the discovery request. For example, NRF 100 may generate a list of NF profiles and associated service profiles of endpoints based on the service identifier. In step 710, the NRF may adjust or set priorities of the NF and service profiles so that priority values of NF and service profiles with latencies exceeding the threshold are increased or set to predetermined values that will reduce the likelihood of selection by a consumer NF. As stated above, in the producer NF selection process, a higher selection priority value means that there is a lower likelihood that a producer NF service instance will be selected to provide a service.

In step 712, the discovery response with the list of NF profiles (including their associated NF service instance profiles) is transmitted to the SCP. For example, NRF 100 may send a list of NF profiles and associated service profiles with SCP-specific latency adjusted priorities to SCP 101.

For non-delegated discovery, control proceeds from step 712 to step 714 where process includes providing the list of NF profiles (including their associated NF service instance profiles) to a consumer NF. For example, SCP 101 may forward the discovery response including the list of NF profiles and associated NF service instance profiles with adjusted priorities to a consumer NF that sent the initial discovery request to SCP 101.

In step 716, process includes receiving a service request directed to a producer NF service instance specified by one of the NF service instance profiles in the list and forwarding the service request to the producer NF service instance. For example, SCP 101 may receive a service request from a consumer NF that is directed to a producer NF and associated service instance previously discovered by the consumer NF using the service discovery procedure. Because the producer NF and service instance are reachable with low latency from the point of view of SCP 101, the likelihood of the consumer NF choosing a sub-optimal producer NF and service instance is reduced.

Returning to step 712, if delegated discovery is indicated by the SCP receiving a service request with a 3gpp-Sbi-Discovery header in step 700, control proceeds from step 712 to step 718 where the SCP selects a producer NF and service instance to process the service request from the list of NF and service profiles received from the NRF using the priorities specified in the list. Because the priorities are adjusted based on SCP-specific latency information, the likelihood of the SCP selecting a sub-optimal producer NF and service instance is reduced.

The disclosure of each of the following references is hereby incorporated herein by reference in its entirety:

REFERENCES 1. 3GPP TS 23.501; 3$^{rd}$ Generation Partnership Project; Technical Specification Group Services and System Aspects; System architecture for the 5G System (5GS); Stage 2 (Release 16) V16.4.0 (2020 March)
2. 3GPP TS 23.502; 3$^{rd}$ Generation Partnership Project; Technical Specification Group Services and System Aspects; Procedures for the 5G System (5GS); Stage 2 (Release 16) (2020 March) V16.4.0 (2020 March)
3. 3GPP TS 29.510; 3$^{rd}$ Generation Partnership Project; Technical Specification Group Core Network and Terminals; 5G System; Network Function Repository Services; Stage 3 (Release 16), V16.4.0 (2020 July)
4. 3GPP TS 29.500; 3$^{rd}$ Generation Partnership Project; Technical Specification Group Core Network and Terminals; 5G System; Technical Realization of Service Based Architecture; Stage 3 (Release 16), V16.4.0 (2020-06)
5. Smoothed moving average algorithm: https://mahifx.com/mfxtrade/indicators/smoothed-moving-average-smma It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for service communication proxy (SCP)-specific prioritized producer network function (NF) discovery and routing, the method comprising:

maintaining, at the SCP, a producer NF latency database including SCP-specific producer NF service instance latency information;

receiving, at the SCP, a discovery request message or receiving a service request message having a 3gpp-Sbi-Discovery header and generating, at the SCP, a discovery request message in response to the received service request message;

modifying, by the SCP, the discovery request message to include the SCP-specific producer NF service instance latency information for at least one service instance of a producer NF instance capable of providing a service identified in the discovery request message;

forwarding, by the SCP, the discovery request message to an NF repository function (NRF);

at the NRF, creating a list of NF and associated service profiles of producer NF instances and their respective producer NF service instances capable of providing the service identified in the discovery request message;

setting or adjusting, by the NRF and based on the SCP-specific producer NF latency information, priorities of NF and service profiles of producer NF and producer NF service instances in the list; and forwarding, by the NRF and to the SCP, a discovery response message including the list of NF and associated service profiles of producer NF instances and their respective producer NF service instances.

2. The method of claim 1 wherein maintaining the producer NF latency database includes, for each producer NF service instance of each producer NF instance, calculating at least one roundtrip time indicating a roundtrip time for messaging between the SCP and the service instance of the producer NF instance.

3. The method of claim 2 wherein calculating at least one roundtrip time includes:

calculating a transport roundtrip time using transport layer messaging between the SCP and the producer NF service instance of the producer NF instance;

calculating a service messaging roundtrip time for service messaging between the SCP and the producer NF service instance of the producer NF instance; and determining, as a true roundtrip time, a maximum of the transport roundtrip time and the service messaging roundtrip time.

4. The method of claim 3 wherein maintaining the producer NF latency database includes storing the true roundtrip time in the producer NF latency database.

5. The method of claim 1 wherein maintaining the producer NF latency database comprises storing, for each producer NF service instance of each producer NF instance, an indicator as to whether a latency between the producer NF service instance of the producer NF instance and the SCP exceeds a threshold.

6. The method of claim 5 wherein modifying the discovery request message to include the latency information includes adding the indicator to the discovery request message.

7. The method of claim 6 wherein setting or adjusting the priorities of the NF and service profiles by the NRF includes increasing or decreasing the priorities of NF and service profiles corresponding to producer NF instances and producer NF service instances for which the indicator is present in the discovery request message.

8. The method of claim 1 wherein modifying the discovery request message includes inserting the producer NF service instance latency information in a custom header of the discovery request message.

9. The method of claim 1 wherein receiving a discovery request message or receiving a service request message comprises receiving a discovery request message, and wherein the method further comprises, at the SCP, in response to receiving the discovery response message forwarding the discovery response message to a consumer NF.

10. The method of claim 1 wherein receiving a discovery request message or a service request message comprises receiving a service request message and wherein the method further comprises, at the SCP, forwarding the service request message to one of the producer NF service instances having a service profile in the list returned by the NRF in the discovery response message.

11. A system for service communication proxy (SCP)-specific prioritized producer network function (NF) discovery and routing, the system comprising:

an SCP including at least one processor;

an NF repository function (NRF) including at least one processor;

an SCP discovery/service request handler and database manager implemented by the at least one processor of the SCP for maintaining a producer NF latency database including SCP-specific producer NF service instance latency information, receiving a discovery request message or receiving a service request message having a 3GPP-Sbi-Discovery header and generating, at the SCP, a discovery request message in response to the received service request message, modifying the discovery request message to include the SCP-specific producer NF service instance latency information for at least one producer NF service instance of a producer NF instance capable of providing a service identified in the discovery request message, and forwarding the discovery request message to the NRF; and an NRF discovery request handler implemented by the at least one processor of the NRF for creating a list of NF and associated service profiles of producer NF instances and their respective producer NF service instances capable of providing the service identified in the discovery request message, setting or adjusting, by the NRF and based on the SCP-specific producer NF latency information, priorities of NF and associated service profiles of producer NF instances and their respective producer NF service instances in the list; and forwarding, by the NRF and to the SCP, a discovery response message including the list of NF profiles and associated service profiles of producer NF instances and their respective producer NF service instances.

12. The system of claim 11 wherein the SCP discovery/service request handler and database manager is configured to, in maintaining the producer NF latency database, for each producer NF service instance of each producer NF instance, calculate at least one roundtrip time indicating a roundtrip time for messaging between the SCP and the producer NF service instance of the producer NF instance.

13. The system of claim 12 wherein the SCP discovery/service request handler and database manager is configured to, in calculating at least one roundtrip time:

calculate a transport roundtrip time using transport layer messaging between the SCP and the producer NF service instance of the producer NF instance;

calculate a service messaging roundtrip time for service messaging between the SCP and the producer NF service instance of the producer NF instance; and determine, as a true roundtrip time, a maximum of the transport roundtrip time and the service messaging roundtrip time.

14. The system of claim 13 wherein the SCP discovery/service request handler and database manager is configured to, in maintaining the producer NF latency database, store the true roundtrip time in the producer NF latency database.

15. The system of claim 11 wherein the SCP discovery/service request handler and database manager is configured to, in maintaining the producer NF latency database, store, for each producer NF service instance of each producer NF instance, an indicator as to whether a latency between the producer NF service instance of the producer NF instance and the SCP exceeds a threshold.

16. The system of claim 15 wherein the SCP discovery/service request handler and database manager is configured to, in modifying the discovery request message to include the latency information, add the indicator to the discovery request message and, in setting or adjusting the priorities of the producer NF and service profiles for which the indicator is present in the discovery request message, the NRF discovery request handler is configured to increase or decrease the priorities of the producer NF and service profiles.

17. The system of claim 11 wherein the SCP discovery/service request handler and database manager is configured to, in modifying the discovery request message, insert the SCP-specific producer NF service instance latency information in a custom header of the discovery request message.

18. The system of claim 11 wherein receiving a discovery request message or receiving a service request message comprises receiving a discovery request message the SCP discovery/service request handler and database manager is configured to:

in response to receiving the discovery response message, forward the discovery response message to a consumer NF;

receive, from the consumer NF, a service request message addressed to one of the producer NF service instances having a producer NF service profile in the list; and forward the service request to the producer NF service instance.

19. The system of claim 11 wherein receiving a discovery request message or a service request message comprises receiving a service request message and wherein the SCP discovery/service request handler and database manager is configured to forward the service request message to one of the service instances of the producer NF instances having a service profile in the list returned by the NRF in the discovery response message.

20. A non-transitory computer readable medium having stored thereon executable instructions that when executed by a processor of a computer control the computer to perform steps comprising:

maintaining, at a service communication proxy (SCP), a producer NF latency database including SCP-specific producer network function (NF) service instance latency information;

receiving, at the SCP, a discovery request message or receiving a service request message having a 3GPP-Sbi-Discovery header and generating, at the SCP, a discovery request message in response to the received service request message;

modifying, by the SCP, the discovery request message to include the SCP-specific producer NF latency information for at least one producer NF service instance of at least one producer NF instance capable of providing a service identified in the discovery request message;

forwarding, by the SCP, the discovery request message to an NF repository function (NRF);

at the NRF, creating a list of NF and associated service profiles of producer NF instances and their respective producer NF service instances capable of providing the service identified in the discovery request message;

setting or adjusting, by the NRF and based on the SCP-specific producer NF latency information, priorities of NF and service profiles of producer NF and producer NF service instances in the list; and forwarding, by the NRF and to the SCP, a discovery response message including the list of NF and associated service profiles of producer NF instances and their respective producer NF service instances.

* * * * *

UNITED STATES PATENT AND TRADEMARK OFFICE
CERTIFICATE OF CORRECTION

PATENT NO. : 11,483,694 B2
APPLICATION NO. : 17/009725
DATED : October 25, 2022
INVENTOR(S) : Rajiv Krishan It is certified that error appears in the above-identified patent and that said Letters Patent is hereby corrected as shown below:

On the Title Page

Column 1, under Item (54) Title, Line 3, delete "COMMUNICATIONS" and insert
-- COMMUNICATION --, therefor.

On page 4, Column 2, under Item (56) Other Publication, Line 52, delete "Netwok" and insert
-- Network --, therefor.

On page 5, Column 1, under Item (56) Other Publication, Line 57, delete "Applicatoin" and insert
-- Application --, therefor.

On page 5, Column 1, under Item (56) Other Publication, Line 60, delete "3." and insert -- 3, --, therefor.

In the Specification

In Column 1, Line 3, delete "COMMUNICATIONS" and insert -- COMMUNICATION --, therefor.

In Column 1, Line 52, delete "communications" and insert -- communication --, therefor.

In Column 1, Lines 55-56, delete "communications" and insert -- communication --, therefor.

In Column 1, Line 56, delete "communications" and insert -- communication --, therefor.

In Column 2, Line 33, delete "communications" and insert -- communication --, therefor.

In Column 4, Line 12, delete "communications" and insert -- communication --, therefor.

In Column 5, Line 25, delete "message" and insert -- message. --, therefor.

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,483,694 B2

In Column 5, Line 52, delete "communications" and insert -- communication --, therefor.

In Column 7, Line 28, delete "user" and insert -- unified --, therefor.

In Column 10, Line 32, delete "ti.tcpi_rtt" and insert -- ti.tcpi_rtt, --, therefor.

In Column 10, Line 33, before "smoothed" insert -- a --, therefor.

In Column 10, Line 34, delete "application" and insert -- applications, --, therefor.

In Column 10, Line 43, before "higher" insert -- a --, therefor.

In Column 10, Line 52, delete "follows." and insert -- follows: --, therefor.

In Column 10, Line 61, delete "algorithm" and insert -- algorithm, --, therefor.

In Column 11, Line 6, after "is" insert -- to be --, therefor.

In Column 11, Line 8, after "When" insert -- an --, therefor.

In Column 11, Line 9, after "If" insert -- the --, therefor.

In Column 13, Line 1, delete "Endpoint" and insert -- An endpoint --, therefor.

In Column 13, Line 4, before "discovery" insert -- a --, therefor.

In Column 13, Line 9, after "At" insert -- the --, therefor.

In Column 13, Line 15, delete "by SCP in" and insert -- by the SCP in the --, therefor.

In Column 13, Line 17, after "in" insert -- the --, therefor.

In Column 13, Line 52, delete "the SCP" and insert -- SCP 101A --, therefor.

In Column 13, Line 58, delete "the SCP" and insert -- SCP 101A --, therefor.

In Column 15, Line 33, delete "101" and insert -- 101A --, therefor.

In Column 15, Line 43, delete "101" and insert -- 101A --, therefor.

In Column 15, Line 48, delete "101" and insert -- 101A --, therefor.

In Column 15, Line 55, delete "101" and insert -- 101A --, therefor.

In Column 16, Line 8, delete "101." and insert -- 101A. --, therefor.

CERTIFICATE OF CORRECTION (continued)
U.S. Pat. No. 11,483,694 B2

In Column 16, Line 12, delete "101" and insert -- 101A --, therefor.

In Column 16, Line 16, delete "101." and insert -- 101A. --, therefor.

In Column 16, Line 22, delete "101" and insert -- 101A --, therefor.

In Column 16, Line 27, delete "101," and insert -- 101A, --, therefor.